United States Patent
Sevignon et al.

(10) Patent No.: US 9,751,992 B2
(45) Date of Patent: Sep. 5, 2017

(54) ELASTOMERIC COMPOSITION HAVING A VERY GOOD DISPERSION OF THE FILLER IN THE ELASTOMERIC MATRIX

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Marc Sevignon, Clermont-Ferrand (FR); Cécile Belin, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/364,273

(22) PCT Filed: Dec. 12, 2012

(86) PCT No.: PCT/EP2012/075140
§ 371 (c)(1),
(2) Date: Jun. 10, 2014

(87) PCT Pub. No.: WO2013/087657
PCT Pub. Date: Jun. 20, 2013

(65) Prior Publication Data
US 2014/0378575 A1    Dec. 25, 2014

(30) Foreign Application Priority Data
Dec. 12, 2011 (FR) ...................... 11 61463

(51) Int. Cl.
*C08J 3/22* (2006.01)
*B60C 1/00* (2006.01)
*C08K 3/04* (2006.01)
*C08K 5/00* (2006.01)

(52) U.S. Cl.
CPC .............. *C08J 3/22* (2013.01); *B60C 1/0016* (2013.04); *C08K 3/04* (2013.01); *C08K 5/0016* (2013.01); *C08J 2307/02* (2013.01); *C08J 2321/00* (2013.01); *C08K 2201/006* (2013.01)

(58) Field of Classification Search
CPC ........................................................ C08J 3/22
USPC ........................................................ 523/156
See application file for complete search history.

(56) References Cited

U.S. PATENT DOCUMENTS

| | | | |
|---|---|---|---|
| 3,700,621 A | 10/1972 | Burke, Jr. | |
| 5,977,238 A | 11/1999 | Labauze | |
| 6,013,718 A | 1/2000 | Cabioch et al. | |
| 6,040,364 A | 3/2000 | Mabry et al. | |
| 6,048,923 A | 4/2000 | Mabry et al. | |
| 6,075,084 A † | 6/2000 | Mabry et al. | |
| 6,503,973 B2 | 1/2003 | Robert et al. | |
| 6,774,255 B1 | 8/2004 | Tardivat et al. | |
| 6,815,473 B2 | 11/2004 | Robert et al. | |
| 2002/0086917 A1 | 7/2002 | Chung et al. | |
| 2003/0212185 A1 | 11/2003 | Vasseur | |
| 2004/0051210 A1 | 3/2004 | Tardivat et al. | |
| 2004/0092648 A1 | 5/2004 | Jones | |
| 2004/0132880 A1 | 7/2004 | Durel et al. | |
| 2004/0167705 A1 | 8/2004 | Lingman | |
| 2005/0016650 A1 | 1/2005 | Durel et al. | |
| 2005/0016651 A1 | 1/2005 | Durel et al. | |
| 2006/0089445 A1 | 4/2006 | Gandon-Pain | |
| 2006/0111475 A1 | 5/2006 | Mabry et al. | |
| 2007/0112120 A1 | 5/2007 | Vasseur | |
| 2008/0156404 A1* | 7/2008 | Brunelet ................... B60C 1/00 152/209.1 |
| 2009/0018238 A1 | 1/2009 | Yanagisawa | |
| 2009/0030135 A1* | 1/2009 | Fujisawa .................. C08K 3/04 524/495 |
| 2009/0186961 A1 | 7/2009 | Da Silva et al. | |
| 2009/0209709 A1 | 8/2009 | Da Silva et al. | |
| 2009/0234066 A1 | 9/2009 | Da Silva et al. | |
| 2009/0308513 A1 | 12/2009 | Ota | |
| 2010/0048799 A1 | 2/2010 | Miyazaki et al. | |
| 2010/0184912 A1 | 7/2010 | Marechal et al. | |
| 2010/0204358 A1* | 8/2010 | Lopitaux ............... B60C 1/0016 523/152 |
| 2010/0249270 A1 | 9/2010 | Robert et al. | |
| 2010/0252156 A1 | 10/2010 | Robert et al. | |
| 2011/0152458 A1 | 6/2011 | Araujo Da Silva et al. | |
| 2012/0277344 A1 | 11/2012 | Wang et al. | |

FOREIGN PATENT DOCUMENTS

CA    2773920 A1 †   3/2011
CN    CN1222878      7/1999
(Continued)

OTHER PUBLICATIONS

PCT/EP2012/075140, International Search Report (ISR), Form PCT/ISA/210, dated Feb. 20, 2013 (including English translation), 7 pgs.
Australian Office Action for Application No. AU2011344438 dated Feb. 10, 2015.
International Search Report on Application PCT/EP2011/072287 dated Mar. 2, 2012.
International Search Report on Application PCT/EP2012/071280 dated Feb. 20, 2013.

(Continued)

*Primary Examiner* — Doris Lee
(74) *Attorney, Agent, or Firm* — Dickinson Wright PLLC

(57) ABSTRACT

The invention relates to a rubber composition based on at least one diene elastomer, a reinforcing filler comprising at least carbon black having a CTAB specific surface of greater than or equal to 130 m²/g, a plasticizing oil and also a crosslinking system, the dispersion of the filler in the elastomeric matrix having a Z score of greater than or equal to 70.

9 Claims, No Drawings

(56) References Cited

FOREIGN PATENT DOCUMENTS

| | | |
|---|---|---|
| CN | 101115785 | 1/2008 |
| CN | 101654531 | 2/2010 |
| DE | 10024613 | 11/2000 |
| EP | 0018751 B1 † | 11/1983 |
| EP | 1127909 | 8/2001 |
| EP | 1321488 | 6/2006 |
| EP | 1873191 | 11/2008 |
| FR | 2740778 | 5/1997 |
| FR | 2765882 | 1/1999 |
| GB | 744509 | 2/1956 |
| JP | 2007161818 A | 6/2007 |
| JP | 2009-173840 A | 6/2009 |
| JP | 201013552 A | 1/2010 |
| JP | 201157967 A | 3/2011 |
| WO | WO0192402 | 12/2001 |
| WO | WO0210269 | 2/2002 |
| WO | WO0230939 | 4/2002 |
| WO | WO0231041 | 4/2002 |
| WO | WO02083782 | 10/2002 |
| WO | WO03002648 | 1/2003 |
| WO | WO03002649 | 1/2003 |
| WO | WO03016837 | 2/2003 |
| WO | WO200496865 | 11/2004 |
| WO | WO2006125532 | 11/2006 |
| WO | WO2006125533 | 11/2006 |
| WO | WO2006125534 | 11/2006 |
| WO | WO2008141702 | 11/2008 |
| WO | WO2009000750 | 12/2008 |
| WO | WO2009000752 | 12/2008 |
| WO | 2011034585 A2 | 3/2011 |

OTHER PUBLICATIONS

ASMT International "Standard Test Method for Carbon Black—Total and External Surface Area by Nitrogen Absorption", Designation: D6556-10, p. 086-1090.
Japanese Office Action With English Translation.
ASTM International, Designation D6556-10, Standard Test Method for Carbon Black—Total and External Surface Area by Nitrogen Adsorption, Sep. 2010, pp. 1-5.†

\* cited by examiner
† cited by third party

ELASTOMERIC COMPOSITION HAVING A VERY GOOD DISPERSION OF THE FILLER IN THE ELASTOMERIC MATRIX

This application is a 371 national phase entry of PCT/EP2012/075140, filed 12 Dec. 2012, which claims benefit of FR 1161463, filed 12 Dec. 2011, the contents of which are incorporated herein by reference for all purposes.

BACKGROUND

1. Field

The disclosure relates to a rubber composition in particular for a tire tread and more particularly for a tire intended to equip vehicles carrying heavy loads and running at sustained speed, such as, for example, lorries, tractors, trailers or buses, aircraft, and the like.

2. Description of Related Art

Some current tires, referred to as "road" tires, are intended to run at high speed and over increasingly long journeys, as a result of the improvement in the road network and of the growth of the motorway network throughout the world. In point of fact, since savings in fuel and the need to protect the environment have become a priority, it is important for the tires to have a low energy consumption. One of the sources of energy dissipation is the heating of the tire.

In the same way, it is known that the treads of the tires used in civil engineering are particularly sensitive to the increase in temperature. In point of fact, there is a constant search to improve the properties of tires and in particular their wear resistance and, conventionally, the improvement in the wear resistance is known to be reflected by an increase in energy consumption.

In order to obtain such an improvement in terms of wear resistance and energy consumption, attempts have been made to use finer reinforcing fillers in the tread, in particular "fine" carbon blacks, that is to say having a CTAB specific surface of greater than or equal to 90 $m^2/g$, indeed even "very fine" blacks, that is to say carbon blacks having a CTAB specific surface of greater than or equal to 130 $m^2/g$. However, in order to obtain the optimum reinforcement and hysteresis properties conferred by a filler in a tire tread and thus a high wear resistance and a low rolling resistance, it is known that it is generally advisable for this filler to be present in the elastomeric matrix in a final form which is both as finely divided as possible and as homogeneously distributed as possible. Such conditions can only be achieved insofar as this filler exhibits a very good ability, on the one hand, to be incorporated in the matrix during the mixing with the elastomer and to deagglomerate and, on the other hand, to disperse homogeneously in this matrix.

In point of fact, very fine blacks are known to be extremely difficult to correctly disperse in the elastomeric matrix and bring about a deterioration in the processability (in comparison with the use of the same content of coarser blacks). One solution for a person skilled in the art would be to use plasticizing oil or resin to improve the processability; however, it is known that the use of such plasticizers with these very fine blacks has the consequence of a very significant deterioration in the breaking energy properties (elongation at break and breaking stress properties).

SUMMARY

The Applicant has discovered, surprisingly, contrary to the knowledge of a person skilled in the art, that the combination of very fine carbon blacks in rubber compositions exhibiting a very good dispersion of the filler in the elastomeric matrix and in the presence of certain specific plasticizing oils makes it possible to simultaneously obtain a good processability without damaging the limiting properties at break.

A subject-matter of the invention, in an embodiment, is thus a rubber composition based on at least one diene elastomer, a reinforcing filler comprising at least carbon black having a CTAB specific surface of greater than or equal to 130 $m^2/g$, a plasticizing oil and also a crosslinking system, the dispersion of the filler in the elastomeric matrix having a Z score of greater than or equal to 70.

Preferably, the content of plasticizing oil in the composition varies from 2 to 50 parts per hundred parts by weight of elastomer, preferably from 5 to 25 phr.

According to a preferred embodiment of the invention, the composition is obtained from a first masterbatch comprising at least the diene elastomer and the carbon black, and exhibiting a dispersion of the carbon black in the elastomeric matrix having a Z score of greater than or equal to 80.

According to an alternative embodiment of the invention, the first masterbatch is obtained by liquid-phase compounding starting from a diene elastomer latex and an aqueous dispersion of carbon black.

This is because there exist different methods for obtaining a masterbatch of diene elastomer and reinforcing filler. In particular, one type of solution consists, in order to improve the dispersability of the filler in the elastomeric matrix, in mixing the elastomer and the filler in the "liquid" phase. In order to do this, recourse is had to an elastomer in the latex form which is provided in the form of elastomer particles dispersed in water and to an aqueous dispersion of the filler, that is to say a filler dispersed in water, commonly referred to as "slurry". Some processes in particular, such as those described in the document U.S. Pat. No. 6,048,923, make it possible to obtain a masterbatch of elastomer and filler exhibiting a very good dispersion of the filler in the elastomeric matrix, which is greatly improved with respect to the dispersion of the filler in the elastomeric matrix capable of being obtained during the solid-phase mixing of elastomer and reinforcing filler. This process consists in particular in incorporating a continuous stream of a first fluid composed of an elastomer latex in the compounding region of a coagulation reactor, in incorporating a second continuous stream of a second fluid composed of an aqueous dispersion of filler under pressure in the compounding region, in order to form a mixture with the elastomer latex; the compounding of these two fluids being sufficiently energetic to allow the elastomer latex to coagulate virtually completely with the filler before the outlet orifice of the coagulation reactor, and in then drying the coagulum obtained.

Another subject-matter of the invention is a composition based on at least one diene elastomer, a reinforcing filler comprising at least carbon black having a CTAB specific surface of greater than or equal to 130 $m^2/g$, a plasticizing oil and also a crosslinking system, obtained from a first masterbatch comprising at least the diene elastomer and the carbon black, and exhibiting a dispersion of the carbon black in the elastomeric matrix having a Z score of greater than or equal to 80.

Preferably, the content of plasticizing oil in the composition varies from 2 to 50 parts per hundred parts by weight of elastomer, preferably from 5 to 25 phr.

According to a preferred embodiment of the invention, the composition is obtained from a first masterbatch comprising at least the diene elastomer and the carbon black, and exhibiting a dispersion of the carbon black in the elastomeric matrix having a Z score of greater than or equal to 80.

According to an alternative embodiment of the invention, the first masterbatch is obtained by liquid-phase compounding starting from a diene elastomer latex and an aqueous dispersion of carbon black, preferably identical to the liquid-phase process described in detail above.

The invention also relates, in an embodiment, to a process for the preparation of a composition comprising at least one diene elastomer, a reinforcing filler comprising at least carbon black having a CTAB specific surface of greater than or equal to 130 m$^2$/g, a plasticizing oil and also a crosslinking system, the dispersion of the filler in the elastomeric matrix having a Z score of greater than or equal to 70, which comprises the following stages:

incorporating all of the constituents of the composition, with the exception of the crosslinking system, in a mixer, everything being kneaded thermomechanically until a maximum temperature of between 130° C. and 200° C. is reached, cooling the combined mixture to a temperature of less than 100° C., subsequently incorporating the crosslinking system, kneading everything up to a maximum temperature of less than 120° C.

Preferably, a first masterbatch comprising at least the diene elastomer and the carbon black, and exhibiting a dispersion of the carbon black in the elastomeric matrix having a Z score of greater than or equal to 80, is prepared prior to the incorporation of all of the constituents of the composition in the mixer.

More preferably still, the masterbatch is produced in the liquid phase starting from at least one elastomer latex and a dispersion of carbon black, in particular according to the process described in detail above.

The invention also relates, in an embodiment, to a process for the preparation of a composition comprising at least one diene elastomer, a reinforcing filler comprising at least carbon black having a CTAB specific surface of greater than or equal to 130 m$^2$/g, a plasticizing oil and also a crosslinking system, which comprises the following stages:

preparing a first masterbatch comprising the diene elastomer and the carbon black, this first masterbatch exhibiting a dispersion of the filler in the elastomeric matrix having a Z score of greater than or equal to 80, incorporating the other constituents of the composition, with the exception of the crosslinking system, in the first masterbatch in a mixer, everything being kneaded thermomechanically until a maximum temperature of between 130° C. and 200° C. is reached, cooling the combined mixture to a temperature of less than 100° C., subsequently incorporating the crosslinking system, kneading everything up to a maximum temperature of less than 120° C.

Preferably, the masterbatch is produced in the liquid phase starting from at least one elastomer latex and a dispersion of carbon black, in particular according to the process described in detail above.

The invention also relates, in an embodiment, to a masterbatch based on at least one diene elastomer, a reinforcing filler comprising at least carbon black having a CTAB specific surface of greater than or equal to 130 m$^2$/g, and a plasticizing oil, the dispersion of the filler in the elastomeric matrix having a Z score of greater than or equal to 70.

Preferably, this masterbatch is obtained from a first masterbatch comprising at least the diene elastomer and the carbon black, and exhibiting a dispersion of the carbon black in the elastomeric matrix having a Z score of greater than or equal to 80.

More preferably still, this first masterbatch is produced in the liquid phase starting from at least one elastomer matrix and a dispersion of carbon black, in particular according to the process described in detail above.

The invention also relates, in an embodiment, to a masterbatch based on at least one diene elastomer, a reinforcing filler comprising at least carbon black having a CTAB specific surface of greater than or equal to 130 m$^2$/g, and a plasticizing oil, obtained from a first masterbatch comprising at least the diene elastomer and the carbon black, and exhibiting a dispersion of the carbon black in the elastomeric matrix having a Z score of greater than or equal to 80.

Preferably, this first masterbatch is produced in the liquid phase starting from at least one elastomer latex and a dispersion of carbon black, in particular according to the process described in detail above.

A final subject-matter of the invention is a finished or semi-finished article, a tire tread, a tire and a semi-finished product comprising a composition as described above or a masterbatch as described above.

The term "masterbatch" is understood to mean, in that which follows: an elastomer-based composite into which a filler and optionally other additives have been introduced.

I.—MEASUREMENTS AND TESTS

The rubber compositions are characterized, before and after curing, as indicated below.

Mooney Plasticity

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the (small-sized) rotor rotates within the test specimen at 2 revolutions/minute and the working torque for maintaining this movement is measured after rotating for 4 minutes. The Mooney plasticity (MS 1+4) is expressed in "Mooney units" (MU, with 1 MU=0.83 newton.meter).

Dispersion

In a known way, the dispersion of filler in an elastomeric matrix can be represented by the Z score, which is measured, after crosslinking, according to the method described by S. Otto et al. in Kautschuk Gummi Kunststoffe, 58 Jahrgang, NR 7-8/2005, in agreement with Standard ISO 11345.

The calculation of the Z score is based on the percentage of surface area in which the filler is not dispersed ("% undispersed surface area"), as measured by the "disperGRADER+" device supplied, with its procedure and its "disperDATA" operating software, by Dynisco, according to the equation:

$$Z=100-(\% \text{ undispersed surface area})/0.35$$

The percentage of undispersed surface area is, for its part, measured by virtue of a camera which observes the surface of the sample under incident light at 30°. The light points are associated with the filler and with agglomerates, while the dark points are associated with the rubber matrix; digital processing converts the image into a black and white image and makes possible the determination of the percentage of undispersed surface area, as described by S. Otto in the abovementioned document.

The higher the Z score, the better the dispersion of the filler in the elastomeric matrix (a Z score of 100 corresponding to a perfect dispersion and a Z score of 0 to a mediocre dispersion). A Z score of greater than or equal to 80 will be regarded as corresponding to a surface exhibiting a very good dispersion of the filler in the elastomeric matrix.

Tensile Tests

These tensile tests make it possible to determine the elasticity stresses and the properties at break. Unless otherwise indicated, they are carried out in accordance with French Standard NF T 46-002 of September 1988. The nominal secant modulus (or apparent stress, in MPa) is measured in first elongation (i.e. after an accommodation cycle at the extension rate provided for the measurement itself) at 100% elongation (denoted M100). The tensile measurements for determining the secant accommodated moduli are carried out at a temperature of 23° C.+/−2° C.) and under standard hygrometry conditions (50+/−5% relative humidity).

The breaking stresses (in MPa) and the elongations at break (in %) are also measured. All these tensile measurements are carried out at a temperature of 60° C.±2° C. and under standard hygrometry conditions (50±5% relative humidity), according to French Standard NF T 40-101 (December 1979).

Dynamic Properties

The dynamic properties and in particular $\tan(\delta)_{max}$, representative of the hysteresis, are measured on a viscosity analyser (Metravib VA4000) according to Standard ASTM D 5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, is recorded under standard temperature conditions (23° C.) according to Standard ASTM D 1349-99 or, as the case may be, at a different temperature; in particular, in the examples cited, the measurement temperature is 60° C. A peak-to-peak strain amplitude sweep is carried out from 0.1% to 50% (outward cycle) and then from 50% to 0.1% (return cycle). The results made use of are the complex dynamic shear modulus (G*) and the loss factor $\tan(\delta)$. For the return cycle, the maximum value of $\tan(\delta)$ observed, denoted $\tan(\delta)_{max}$, is indicated.

II. DETAILED DESCRIPTION OF THE INVENTION

The invention relates to a composition based on at least one diene elastomer, a reinforcing filler comprising at least carbon black having a CTAB specific surface of greater than or equal to 130 m$^2$/g, a plasticizing oil and also a crosslinking system, the dispersion of the filler in the elastomeric matrix having a Z score of greater than or equal to 70.

According to one embodiment of the invention, this composition is obtained from a first masterbatch comprising at least the diene elastomer and the carbon black and exhibiting a dispersion of the black of 80.

In the present description, unless expressly indicated otherwise, all the percentages (%) shown are % by weight. Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

II-1) Diene Elastomer

As is customary, the terms "elastomer" and "rubber", which are interchangeable, are used without distinction in the text.

The composition in accordance with the invention comprises at least one first diene elastomer and optionally a second elastomer identical to or different from the first, which can thus be, or not, a diene elastomer.

A "diene" elastomer or rubber should be understood, in a known way, as meaning an elastomer resulting at least in part (i.e., a homopolymer or a copolymer) from diene monomers (monomers carrying two conjugated or non-conjugated carbon-carbon double bonds).

These diene elastomers can be classified into two categories: "essentially unsaturated" or "essentially saturated". Generally, "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or copolymers of dienes and α-olefins of EPDM type do not come within the preceding definition and can in particular be described as "essentially saturated" diene elastomers (low or very low content, always less than 15%, of units of diene origin). In the category of "essentially unsaturated" diene elastomers, "highly unsaturated" diene elastomer is understood to mean in particular a diene elastomer having a content of units of diene origin (conjugated dienes) which is greater than 50%.

Among these diene elastomers, natural rubber and synthetic elastomers are furthermore distinguished.

By synthetic diene elastomers capable of being used in accordance with the invention, the expression "diene elastomer" is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure, which depends on the polymerization conditions used, in particular on the presence or absence of a modifying and/or randomizing agent and on the amounts of modifying and/or randomizing agent employed. The elastomers can, for example, be block, statistical, sequential or microsequential elastomers and can be prepared in dispersion or in solution; they can be coupled and/or star-branched or else functionalized with a coupling and/or star-branching or functionalization agent. Mention may for example be made, for coupling to carbon black, of functional groups comprising a C—Sn bond or aminated functional groups, such as aminobenzophenone, for example; mention may for example be made, for coupling to an inorganic filler, such as silica, of silanol or polysiloxane functional groups having a silanol end (such as described, for example, in FR 2 740 778 or U.S. Pat. No. 6,013,718 and WO 2008/141702), alkoxysilane groups (such as described, for example, in FR 2 765 882 or U.S. Pat. No. 5,977,238), carboxyl groups (such as described, for example, in WO 01/92402 or U.S. Pat. No. 6,815,473, WO 2004/096865 or US 2006/0089445) or polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes and in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and in particular those having an isoprene content of between 5% and 90% by weight and a Tg of −40° C. to −80° C., or isoprene/styrene copolymers and in particular those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To summarize, the synthetic diene elastomer or elastomers according to the invention are preferably selected from the group of highly unsaturated diene elastomers formed by polybutadienes (abbreviated to BRs), synthetic polyisoprenes (IRs), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

As was specified above, liquid-phase compounding processes are preferably used to make it possible to obtain masterbatches based on diene elastomer and on carbon black exhibiting a very good dispersion of the carbon black in the elastomer. Thus, in particular for the preparation of the first masterbatch of diene elastomer and carbon black, use will more particularly be made of a diene elastomer latex, the elastomer latex being a particular form of the elastomer which exists in the form of water-dispersed elastomer particles.

The invention thus preferably relates to latexes of diene elastomers, the diene elastomers being those defined above.

More particularly, for natural rubber (NR), which is particularly suitable for the invention, this natural rubber exists in various forms, as explained in detail in Chapter 3, "Latex concentrates: properties and composition", by K. F. Gaseley, A. D. T. Gordon and T. D. Pendle in "Natural Rubber Science and Technology", A. D. Roberts, Oxford University Press—1988.

In particular, several forms of natural rubber latex are sold: the natural rubber latexes referred to as "field latexes", the natural rubber latexes referred to as "concentrated natural rubber latexes", epoxidized latexes (ENRs), deproteinized latexes or also prevulcanized latexes. The natural rubber field latex is a latex to which ammonia has been added in order to prevent premature coagulation and the concentrated natural rubber latex corresponds to a field latex which has undergone a treatment corresponding to a washing, followed by a further concentration. The various categories of concentrated natural rubber latexes are listed in particular according to Standard ASTM D 1076-06. Singled out in particular among these concentrated natural rubber latexes are the concentrated natural rubber latexes of the grade referred to as: "HA" (high ammonia) and of the grade referred to as "LA"; for the invention, use will advantageously be made of concentrated natural rubber latexes of HA grade.

The NR latex can be physically or chemically modified beforehand (centrifugation, enzymatic treatment, chemical modifier, and the like).

The latex can be used directly or be diluted beforehand in water to facilitate the processing thereof.

Thus, as synthetic elastomer latex, the latex can in particular consist of a synthetic diene elastomer already available in the form of an emulsion (for example, a butadiene/styrene copolymer, SBR, prepared in emulsion) or consist of a synthetic diene elastomer initially in solution (for example, an SBR prepared in solution) which is emulsified in a mixture of organic solvent and water, generally by means of a surface-active agent.

An SBR latex, in particular an SBR prepared in emulsion ("ESBR") or an SBR prepared in solution ("SSBR"), and more particularly an SBR prepared in emulsion, is particularly suitable for the invention.

There exist two main types of processes for the emulsion copolymerization of styrene and butadiene, one of them, or hot process (carried out at a temperature close to 50° C.), being suitable for the preparation of highly branched SBRs, whereas the other, or cold process (carried out at a temperature which can range from 15° C. to 40° C.), makes it possible to obtain more linear SBRs.

For a detailed description of the effectiveness of several emulsifiers which can be used in the said hot process (as a function of the contents of the said emulsifiers), reference may be made, for example, to the two papers by C. W. Carr, I. M. Kolthoff and E. J. Meehan, University of Minnesota, Minneapolis, Minn., which appeared in the Journal of Polymer Science of 1950, Vol. V, No. 2, pp. 201-206, and of 1951, Vol. VI, No. 1, pp. 73-81.

Regarding comparative examples of the implementation of the said cold process, reference may be made, for example, to the paper Industrial and Engineering Chemistry, 1948, Vol. 40, No. 5, pp. 932-937, E. J. Vandenberg and G. E. Hulse, Hercules Powder Company, Wilmington, Del., and to the paper Industrial and Engineering Chemistry, 1954, Vol. 46, No. 5, pp. 1065-1073, J. R. Miller and H. E. Diem, B. F. Goodrich Chemical Co., Akron, Ohio.

In the case of an SBR (ESBR or SSBR) elastomer, use is made in particular of an SBR having a moderate styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1, 4-bonds.

It should be noted that it is possible to envisage using one or more natural rubber latexes as a blend, one or more synthetic rubber latexes as a blend, or a blend of one or more natural rubber latexes with one or more synthetic rubber latexes.

The following are particularly suitable as the second elastomer of the composition, if appropriate, when it is not a diene elastomer: non-diene butyl elastomers, such as poly(isobutylene) homopolymers or poly(isobutylene)-based copolymers (of course, when it is a question of copolymers with isoprene, the diene elastomers described above are re-encountered), and also the halogenated derivatives, in particular generally brominated or chlorinated derivatives, of these poly(isobutylene) homopolymers and poly(isobutylene)-based copolymers.

The non-diene elastomers also suitably include copolymers of isobutylene and of styrene derivatives, such as brominated isobutylene/methylstyrene (BIMS) copolymers, among which is found in particular the elastomer named Exxpro sold by Exxon. Mention may also be made, as non-diene elastomer particularly suitable for the invention, of non-diene thermoplastic elastomers (TPEs).

Advantageously, the fraction by weight of the first diene elastomer in the elastomeric matrix is greater than or equal to 50% and preferably greater than or equal to 60%.

II-2) Fillers

Use is made, as reinforcing filler, of an organic filler composed of carbon black. All reinforcing carbon blacks having a CTAB specific surface of greater than or equal to 130 m$^2$/g and more particularly still the carbon blacks having a CTAB specific surface of greater than or equal to 160 m$^2$/g are suitable as carbon blacks.

It is specified that the CTAB specific surface is determined according to French Standard NF T 45-007 of November 1987 (method B).

This carbon black can be combined, in a blend, with one or more other organic fillers, such as, for example, functionalized polyvinylaromatic organic fillers, such as described in Applications WO-A-2006/069792 and WO-A-2006/069793, and/or with one or more reinforcing inorganic fillers, such as silica.

Thus, the term "inorganic filler" should be understood here as meaning, in a known way, any inorganic or mineral filler, whatever its colour and its origin (natural or synthetic), also known as "white filler", "clear filler" or also "non-black filler", in contrast to carbon black, this inorganic filler being capable of reinforcing, by itself alone, without means other than an intermediate coupling agent, a rubber composition intended for the manufacture of a tread for tires, in other words capable of replacing, in its reinforcing role, a conventional tire-grade carbon black for a tread. Such a filler is generally characterized by the presence of functional groups, in particular hydroxyl (—OH) functional groups, at its surface, requiring, in order to be used as reinforcing filler, the use of a coupling agent or system intended to provide a stable chemical bond between the isoprene elastomer and the said filler.

Such an inorganic filler can thus be used with a coupling agent in order to make possible the reinforcement of the rubber composition in which it is included. It can also be used with a covering agent (which does not provide a bond between the filler and the elastomeric matrix), in addition to a coupling agent or not (in this case, the inorganic filler does not act as reinforcement).

The physical state under which the inorganic filler is provided is not important, whether it is in the form of a powder, microbeads, granules, beads or any other appropriate densified form. Of course, the term "inorganic filler" is also understood to mean mixtures of various inorganic fillers, in particular of highly dispersible siliceous and/or aluminous fillers, as described below.

Mineral fillers of the siliceous type, in particular silica ($SiO_2$), or of the aluminous type, in particular alumina ($Al_2O_3$), are suitable in particular as inorganic fillers. The silica used can be any silica known to a person skilled in the art, in particular any precipitated or fumed silica exhibiting a BET specific surface and a CTAB specific surface which are both less than 450 m$^2$/g, preferably from 30 to 400 m$^2$/g. Mention will be made, as highly dispersible precipitated silicas ("HDSs"), for example, of the Ultrasil 7000 and Ultrasil 7005 silicas from Evonik, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

It is also possible to envisage the addition of filler to the carbon black, such as carbon blacks partially or completely covered with silica via a post-treatment or the carbon blacks modified in situ by silica, such as, without implied limitation, the fillers sold by Cabot Corporation under the name Ecoblack™ CRX 2000 or CRX 4000.

Preferably, the content of total filler (carbon black and inorganic filler, such as silica) is between 20 and 200 phr, more preferably between 30 and 150 phr and more preferably still between 30 and 100 phr, the optimum being, in a known way, different depending on the particular applications targeted: the level of reinforcement expected with regard to a bicycle tire, for example, is of course less than that required with regard to a tire capable of running at high speed in a sustained manner, for example a motorcycle tire, a tire for a passenger vehicle or a tire for a utility vehicle, such as a heavy duty vehicle.

According to a preferred embodiment of the invention, use is made of carbon black, the content of which varies from 20 to 80 phr, and it is possible to combine it preferably with an inorganic filler, in particular silica, the content of which varies from 5 to 50 phr, more particularly the total filler of the composition comprising carbon black, the content of which varies from 35 to 70 phr, and an inorganic filler, in particular silica, the content of which varies from 5 to 35 phr, more preferably still the total filler comprising carbon black, the content of which varies from 40 to 65 phr, and an inorganic filler, in particular silica, the content of which varies from 10 to 30 phr.

II-3)—Plasticizing Oil

The rubber compositions of the invention use an extending oil (or plasticizing oil), the usual role of which is to facilitate the processing, by a fall in the Mooney plasticity, and to improve the endurance, by a decrease in the cured moduli of elongation.

At ambient temperature (23° C.), these oils, which are more or less viscous, are liquids (that is to say, as a reminder, substances which have the ability to eventually assume the shape of their container), in contrast in particular to resins or rubbers, which are by nature solids.

Preferably, the extending oil is selected from the group consisting of polyolefinic oils (that is to say, resulting from the polymerization of monoolefinic or diolefinic olefins), paraffinic oils, naphthenic oils (of low or high viscosity), aromatic oils, mineral oils and the mixtures of these oils.

The number-average molecular weight (Mn) of the extending oil is preferably between 200 and 25 000 g/mol, more preferably still between 300 and 10 000 g/mol. For excessively low Mn weights, there exists a risk of migration of the oil outside the composition, whereas excessively high weights can result in excessive stiffening of this composition. An Mn weight of between 350 and 4000 g/mol, in particular between 400 and 3000 g/mol, has proved to constitute an excellent compromise for the targeted applications, in particular for use in a tire.

The number-average molecular weight (Mn) of the extending oil is determined by SEC, the sample being dissolved beforehand in tetrahydrofuran at a concentration of approximately 1 g/l; the solution is then filtered through a filter with a porosity of 0.45 µm before injection. The apparatus is the Waters Alliance chromatographic line. The elution solvent is tetrahydrofuran, the flow rate is 1 ml/min, the temperature of the system is 35° C. and the analytical time is 30 min. A set of two Waters columns with the Styragel HT6E name is used. The injected volume of the solution of the polymer sample is 100 µl. The detector is a Waters 2410 differential refractometer and its associated software, for making use of the chromatographic data, is the Waters Millennium system. The calculated average molar masses are relative to a calibration curve produced with polystyrene standards.

A person skilled in the art will know, in the light of the description and implementational examples which follow, how to adjust the amount of plasticizer as a function in particular of the pneumatic object in which it is intended to be used.

The content of plasticizing oil is preferably between 2 and 35 phr. Below the minimum indicated, the targeted technical effect can prove to be insufficient while, above the maximum, the tackiness of the compositions in the raw state, with regard to the compounding devices, can in some cases become totally unacceptable from the industrial viewpoint. The content of plasticizing oil is more preferably still between 5 and 25 phr.

II-4) Masterbatches—Rubber Composition

Advantageously, the masterbatches and the compositions thus produced are capable of being used in tire applications.

The rubber compositions for tires based on masterbatches and on inorganic filler according to the invention can also comprise, in a known way, a coupling agent and/or a covering agent and a vulcanization system.

Use is made, in a known way, in order to couple the reinforcing inorganic filler to the diene elastomer, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or US 2005/016651) and WO 03/002649 (or US 2005/016650).

Suitable in particular, without the definition below being limiting, are silane polysulphides referred to as "symmetrical", corresponding to the following general formula (III):

Z-A-S$_x$-A-Z, in which: (III)

x is an integer from 2 to 8 (preferably from 2 to 5);

A is a divalent hydrocarbon radical (preferably $C_1$-$C_{18}$ alkylene groups or $C_6$-$C_{12}$ arylene groups, more particularly $C_1$-$C_{10}$, in particular $C_1$-$C_4$, alkylenes, in particular propylene);

Z corresponds to one of the formulae below:

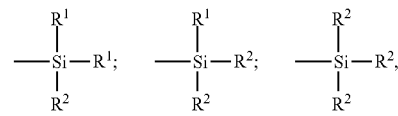

in which:

the $R^1$ radicals, which are substituted or unsubstituted and identical to or different from one another, represent a $C_1$-$C_{18}$ alkyl group, a $C_5$-$C_{18}$ cycloalkyl group or a $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl), the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (III), in particular normal commercially available mixtures, the mean value of the "x" indices is a fractional number preferably of between 2 and 5, more preferably of approximately 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is made in particular, among these compounds, of bis(3-triethoxysilylpropyl) tetrasulphide, abbreviated to TESPT, of formula $[(C_2H_5O)_3Si(CH_2)_3S_2]_2$, or bis(triethoxysilylpropyl) disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl) polysulphides (in particular disulphides, trisulphides or tetrasulphides), more particularly bis(monoethoxydimethylsilylpropyl) tetrasulphide, such as described in Patent Application WO 02/083782 (or US 2004/132880).

Mention will in particular be made, as coupling agent other than an alkoxysilane polysulphide, of bifunctional POSs (polyorganosiloxanes) or else of hydroxysilane polysulphides ($R^2$=OH in the above formula III), such as described in Patent Applications WO 02/30939 (or U.S. Pat. No. 6,774,255) and WO 02/31041 (or US 2004/051210), or else of silanes or POSs bearing azodicarbonyl functional groups, such as described, for example, in Patent Applications WO 2006/125532, WO 2006/125533 and WO 2006/125534.

Processing aids capable, in a known way, by virtue of an improvement in the dispersion of the inorganic filler in the rubber matrix and of a lowering in the viscosity of the compositions, of improving their ease of processing in the raw state will generally be considered as covering agent, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

In the rubber compositions in accordance with the invention, the content of coupling agent is preferably between 0.1% and 12% by weight of the inorganic filler for a CTAB specific surface of 160 $m^2/g$, more preferably between 4% and 10% by weight of the inorganic filler for a CTAB specific surface of 160 $m^2/g$; and/or the content of covering agent is preferably between 0.1% and 20% by weight of the inorganic filler for a CTAB specific surface of 160 $m^2/g$, more preferably between 5% and 20% by weight of the inorganic filler for a CTAB specific surface of 160 $m^2/g$, it being possible for the content of coupling agent to be adjusted to the level of specific surface of the filler.

A person skilled in the art will understand that a filler of another nature, in particular organic nature, might be used as filler equivalent to the inorganic filler described in the present section, provided that this filler is covered with an inorganic layer, such as silica, or else comprises, at its surface, functional sites, in particular hydroxyls, requiring the use of a coupling agent in order to form the connection between the filler and the elastomer.

These rubber compositions in accordance with the invention can also comprise all or a portion of the usual additives generally used in elastomer compositions intended for the manufacture of tires, in particular of treads, such as, for example, other plasticizers, pigments, protective agents, such as antiozone waxes, chemical antiozonants or antioxidants, antifatigue agents, reinforcing resins, methylene acceptors (for example phenolic novolak resin) or methylene donors (for example HMT or H3M), such as described, for example, in Application WO 02/10269, a crosslinking system based either on sulphur or on sulphur donors and/or on peroxide and/or on bismaleimides, or vulcanization accelerators.

It should be noted that it is also possible to envisage producing the masterbatches in accordance with the invention by incorporating therein, in particular before the drying phase of the production of the masterbatch in the liquid phase, additives such as described above, antioxidant, coupling agent, covering agent, and the like.

II-5). Manufacture of the Rubber Compositions and Masterbatches

The rubber compositions of the invention are manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature of between 130° C. and 200° C., preferably between 145° C. and 185° C., followed by a second phase of mechanical working (sometimes referred to as a "productive" phase) at lower temperature, typically below 120° C., for example between 60° C. and 100° C., during which finishing phase the crosslinking or vulcanization system is incorporated.

According to a preferred embodiment of the invention, all the base constituents of the compositions of the invention, with the exception of the vulcanization system, are intimately incorporated, by kneading, during the first "non-productive" phase, that is to say that at least these various base constituents are introduced into the mixer and are thermomechanically kneaded, in one or more stages, until the maximum temperature of between 130° C. and 200° C., preferably of between 145° C. and 185° C., is reached.

According to a preferred embodiment of the invention, the plasticizing oil and also the base constituents of the compositions of the invention, with the exception of the vulcanization system, in particular, if appropriate, the inorganic filler, such as the silica, are incorporated in the diene elastomer and in the carbon black, which have been prepared beforehand in the form of a first masterbatch.

Preferably, this first masterbatch is produced in the "liquid" phase. To do this, recourse has been had to the diene elastomer in the form of a latex, which exists in the form of water-dispersed elastomer particles, and to an aqueous dispersion of the carbon black, that is to say a filler dispersed in water, commonly known as "slurry". More preferably still, the stages of the process described in the document U.S. Pat. No. 6,048,923 will be followed, which process consists in particular in incorporating a continuous stream of a first fluid composed of the elastomer latex in the compounding region of a coagulation reactor, in incorporating a second continuous stream of a second fluid composed of an aqueous dispersion of carbon black under pressure in the compounding region, in order to form a mixture with the elastomer latex; the compounding of these two fluids being sufficiently energetic to allow the elastomer latex to coagulate virtually completely with the carbon black before the outlet orifice of the coagulation reactor, and in then drying the coagulum obtained.

According to another preferred embodiment of the invention, the inorganic filler and the second elastomer are incorporated in the first masterbatch by also being provided in the form of a second masterbatch which will have been prepared beforehand. This second masterbatch can be prepared in particular in the solid form by thermomechanically kneading the second elastomer and the inorganic filler; it can also be prepared by any other process and in particular it can also be prepared in the liquid phase.

It should in particular be noted that, in the case of the incorporation of a second elastomer and/or of an inorganic filler, this or these incorporations can be carried out simultaneously with the introduction into the mixer of the other constituents (in particular the first diene elastomer or first masterbatch) but also advantageously that this or these incorporations can be offset in time from a few tens of seconds to a few minutes. It should be noted that, in the case of an addition of an inorganic filler and a second elastomer, these can be introduced separately or in the form of a second masterbatch comprising the second elastomer and the inorganic filler. In the case of the introduction of the second elastomer alone and the inorganic filler alone, offset in time from a few tens of seconds to a few minutes, the inorganic filler can be introduced before, after or simultaneously with the second elastomer.

By way of example, the first (non-productive) phase is carried out in a single thermomechanical stage during which all the necessary constituents (if appropriate in the form of a masterbatch as specified above), the optional additional covering agents or processing aids and various other additives, with the exception of the vulcanization system, are introduced into an appropriate mixer, such as a standard internal mixer. The total duration of the kneading, in this non-productive phase, is preferably between 1 and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 and 15 min.

The crosslinking system is preferably a vulcanization system, that is to say a system based on sulphur (or on a sulphur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulphur is used at a preferred content of between 0.5 and 12 phr, in particular between 1 and 10 phr. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator for the vulcanization of diene elastomers in the presence of sulphur, in particular accelerators of the thiazole type, and also their derivatives, and accelerators of thiuram and zinc dithiocarbamate types. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("DCBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC") and the mixtures of these compounds.

The final composition thus obtained is subsequently calendered, for example in the form of a sheet or of a plaque, in particular for laboratory characterization, or else extruded in the form of a rubber profiled element which can be used, for example, as a tire tread for a passenger vehicle, heavy duty vehicle, and the like.

III. EXEMPLARY EMBODIMENTS OF THE INVENTION

The examples illustrate the improvement in the properties in terms of processability and of properties at break of rubber compositions in accordance with the invention in comparison with control rubber compositions which differ from the compositions of the invention either in the CTAB specific surface of the carbon black, or in the absence of plasticizing oil, or, finally, in the poor dispersion (Z score) of the carbon black in the composition.

The rubber compositions which follow were prepared, for some, from a masterbatch produced in the liquid phase of natural rubber and carbon black and, for others, by a solid-phase compounding.

III-1 Preparation of Masterbatch of Natural Rubber and Carbon Black

The masterbatches of diene elastomer and carbon black used in some of the compositions which follow are produced in the liquid phase according to the process described in U.S. Pat. No. 6,048,923.

Thus, masterbatches are prepared, according to the protocol described in detail in the abovementioned patent, respectively from carbon black N234 and carbon black N134, sold by Cabot Corporation, and natural rubber field latex originating from Malaysia and exhibiting a rubber solids content of 28% and an ammonia content of 0.3%.

Masterbatches A of natural rubber and carbon black (with carbon black N234 or carbon black N134) are thus obtained in which the content of carbon black is 50 phr.

III-2 Preparation of the Rubber Compositions

The control compositions CC are produced according to a conventional solid-form compounding process in which the elastomer, thus natural rubber in these examples, and the reinforcing filler, respectively, depending on the compositions: carbon black N234 and carbon black N134, sold by Cabot Corporation.

The control rubber compositions CRC are produced from the masterbatch A (including carbon black N234 or carbon black N134).

The various compositions are produced in the following way:

The following tests are carried out in the following way: the natural rubber in the solid form and the carbon black, for the CC compositions, or the masterbatch A, for the CRC compositions, and the various other ingredients, with the exception of the vulcanization system, are introduced into an internal mixer which is 70% filled and which has an initial vessel temperature of approximately 90° C. Thermomechanical working (non-productive phase) is then carried out in one stage (total duration of the kneading equal to approximately 5 min), until a maximum "dropping" temperature of approximately 165° C. is reached.

The mixture thus obtained is recovered and cooled and then the vulcanization system (sulphur and sulphenamide accelerator) is added on an external mixer (homofinisher) at 70° C., everything being mixed (productive phase) for approximately 5 to 6 min The compositions thus obtained are subsequently calendered, either in the form of plaques (thickness of 2 to 3 mm) or thin sheets of rubber, for the measurement of their physical or mechanical properties, or in the form of profiled elements which can be used directly, after cutting and/or assembling to the desired dimensions, for example as semi-finished products for tires, in particular as tire treads.

III-3 Tests

The rubber composition CC1 is prepared "in bulk" from natural rubber and carbon black in the solid form, as described in detail in section III-2; the compositions CRC1 and CRC2 not in accordance with the invention and the compositions CRC3 and CRC4 in accordance with the invention are prepared from masterbatches A according to the process described in detail in section III-2.

All of the compositions, whatever the manufacturing process, have the following base formulation (in phr):

| | |
|---|---|
| natural rubber | 100 |
| 6PPD (a) | 1.5 |
| stearic acid | 2 |

-continued

| | |
|---|---|
| zinc oxide (c) | 3 |
| accelerator (d) | 1.4 |
| sulphur | 1.4 |

(a) N-(1,3-dimethylbutyl)-N-phenyl-para-phenylenediamine (Santoflex 6-PPD from Flexsys);
(c) zinc oxide (industrial grade - Umicore)
(d) N-cyclohexyl-2-benzothiazolesulphenamide (Santocure CBS from Flexsys).

In addition to these constituents, the CC and CRC compositions differ from one another in their Z score, the nature of the carbon black and the nature and the presence of plasticizing oil, as described in detail in Table 1 below.

TABLE 1

| | Compositions | | | | |
|---|---|---|---|---|---|
| | CC1 | CRC1 | CRC2 | CRC3 | CRC4 |
| Carbon black (1) | — | 50 | — | — | — |
| Carbon black (2) | 50 | — | 50 | 50 | 50 |
| Oil (3) | 10 | 10 | — | 10 | — |
| Oil (4) | — | — | — | — | 10 |
| Z score | 50 | 88 | 86 | 78 | 87 |

(1) N234, sold by Cabot Corporation (CTAB 115 m$^2$/g)
(2) N134, sold by Cabot Corporation (CTAB 135 m$^2$/g)
(3) Oil, Extensoil 1721, sold by Repsol
(4) Oil, MES-H, sold by Repsol The properties measured before and after curing at 150° C. for 40 minutes are given in Table 2 below.

TABLE 2

| | Compositions | | | | |
|---|---|---|---|---|---|
| | CC1 | CRC1 | CRC2 | CRC3 | CRC4 |
| Properties before curing | | | | | |
| Mooney | 87 | 58 | 71 | 56 | 54 |
| Properties after curing | | | | | |
| Breaking stress at 60° C. (MPa) | 53 | 51 | 50 | 59 | 66 |
| Elongation at break at 60° C. (%) | 265 | 233 | 183 | 230 | 241 |
| Breaking energy | 140 | 118 | 91.5 | 136 | 160 |
| tan($\delta$)$_{max}$ | 0.12 | 0.11 | 0.12 | 0.10 | 0.10 |

It is found that the compositions in accordance with the invention CRC3 and CRC4 exhibiting a high Z score (greater than or equal to 70) and also having a CTAB of greater than or equal to 130 m$^2$/g and a plasticizing oil in accordance with the invention (with a different oil nature) make it possible, surprisingly, to significantly improve the processability of the composition (lower Mooney value) in comparison with a control composition CC1 without damaging the properties at break (stress, elongation, energy), indeed even while improving them (composition CRC4), in contrast to the composition CRC1 (comprising a carbon black having a CTAB specific surface of less than 130 m$^2$/g), which improves the processability but damages the properties at break, and in contrast to the composition CRC2, which has damaged properties at break and a poorer processability (equivalent to CC1).

Thus, it is observed that it is this specific compromise in dispersion of the filler in the elastomeric matrix, in nature of the filler and in presence of plasticizing oil which makes it possible, surprisingly, to produce an improvement in the processability of the composition without damaging the other properties of the mixture.

The invention claimed is:

1. A process for the preparation of a rubber composition comprising the steps of:
    providing a dried coagulum comprising at least one diene elastomer and a reinforcing filler, the reinforcing filler comprising at least carbon black having a CTAB specific surface of greater than or equal to 130 m$^2$/g;
    providing a plasticizing system consisting of a plasticizing oil selected from the group consisting of a polyolefinic oil, a paraffinic oil, a naphthenic oil, an aromatic oil, a mineral oil, or mixtures thereof;
    incorporating the dried coagulum and the plasticizing system in a mixer, and kneading everything thermomechanically until a maximum temperature of between 130° C. and 200° C. is reached,
    cooling the combined mixture to a temperature of less than 100° C.,
    subsequently incorporating a crosslinking system into the mixture,
    kneading everything up to a maximum temperature of less than 120° C., wherein the dispersion of the filler in the rubber composition has a Z score of 70 or greater.

2. The process according to claim 1, wherein a first masterbatch comprising the dried coagulum of the at least one diene elastomer and the carbon black, and exhibiting a dispersion of the carbon black in the first masterbatch having a Z score of greater than or equal to 80, is prepared prior to the incorporation of the dried coagulum in the mixer.

3. The process according to claim 1, wherein the content of plasticizing oil varies from 2 to 50 parts per hundred parts by weight of elastomer.

4. The process according to claim 1, further comprising introducing an inorganic filler, a second elastomer, or both into the composition simultaneously with the other constituents during the first kneading step.

5. The process according to claim 1, wherein an inorganic filler and a second elastomer are introduced into the composition in the form of a second masterbatch prepared prior to its incorporation into the first kneading step.

6. The process according to claim 1, wherein the diene elastomer is selected from the group consisting of polybutadienes, natural rubber, synthetic polyisoprenes, butadiene copolymers, isoprene copolymers and the mixtures of these elastomers.

7. The process according to claim 6, wherein the diene elastomer is a natural rubber.

8. The process according to claim 1, wherein an inorganic filler and a second elastomer are introduced separately into the composition, the inorganic filler being introduced before or after the second elastomer.

9. The process according to claim 8, wherein the introduction of the inorganic filler and/or of the second elastomer is offset in time from a few tens of seconds to a few minutes with respect to the introduction of the dried coagulum into the mixer.

* * * * *